United States Patent [19]
Rosse

[11] Patent Number: 5,199,184
[45] Date of Patent: Apr. 6, 1993

[54] FLUIDIZED-BED OR EFFERVESCENT BED CHAMBER, TREATMENT TOWER AND PROCESS IN TWO STAGES

[75] Inventor: Roger Rosse, Emmenbrücke, Switzerland

[73] Assignee: Bühler AG, Uzwil, Switzerland

[21] Appl. No.: 455,457

[22] PCT Filed: May 9, 1988

[86] PCT No.: PCT/CH88/00086
§ 371 Date: Jan. 9, 1990
§ 102(e) Date: Jan. 9, 1990

[87] PCT Pub. No.: WO89/11073
PCT Pub. Date: Nov. 16, 1989

[51] Int. Cl.[5] .............................................. F26B 3/08
[52] U.S. Cl. ...................................... 34/10; 34/57 R; 34/57 C
[58] Field of Search ............ 34/10, 57 A, 57 B, 57 R, 34/60, 57 C

[56] References Cited
U.S. PATENT DOCUMENTS 3,518,777  7/1970  Kono .................... 34/57 E X
3,964,175  6/1976  Sivetz ................... 34/57 A
4,132,006  1/1979  Scholz et al. ............. 34/10

FOREIGN PATENT DOCUMENTS 7600     5/1988  Australia ................. 34/57 R
3325967  2/1985  Fed. Rep. of Germany ..... 34/57 R
1478224  4/1967  France ................... 34/57 R
1122644  8/1968  United Kingdom ........... 34/57 R Primary Examiner—Henry A. Bennet
Attorney, Agent, or Firm—Martin A. Farber

[57] ABSTRACT

The apparatus consists of a vertically arranged tube which simultaneously forms the jacket (9) of the effervescent bed chamber (1) of the crystallizer and of the chamber (3) of the drier. The crystallizer and drier are connected to one another via an aeration surface (6) which is provided with pneumatic means (7) whose permeability decreases in the direction of flow of the granules. In a process for the continuous crystallization and drying of plastics granules, crystallization is carried out in an effervescent bed and drying is carried out in a fluidized bed moving relatively slowly, by means of a hot addition of gas under isothermal conditions. The drier according to the invention is a simple, economical solution for the drying of plastics granules.

23 Claims, 2 Drawing Sheets

FLUIDIZED-BED OR EFFERVESCENT BED CHAMBER, TREATMENT TOWER AND PROCESS IN TWO STAGES

The invention relates to a fluidized-bed and effervescent bed chamber according to the preamble of claim 1. A chamber of this type is disclosed in German Patent 1,667,058. As in all effervescent bed apparatuses, an inclined surface in the form of a central cone holding a tube, the said cone being intended to produce a region of lower flow velocity to cause the product introduced into the chamber to be fluidized upwards under the action of an upward-flowing fluid, but to fall downward again in the regions of lower flow velocity. This measure is intended to ensure thorough mixing and hence uniform treatment of the material introduced.

When a treatment of the introduced product is discussed here, it is of course also true that, conversely, the product introduced (solid) can also serve appropriately to influence the fluid flowing through, for example to absorb undesirable gas constituents.

Conventional effervescent bed chambers have the disadvantage that they are only suitable for batchwise operation. Where attempts have been made to circulate the product around the central displacement element inside the chamber, this has been done essentially to improve the mixing effect.

It is the object of the invention to retain the advantages of a known effervescent chamber but to design such a chamber so that continuous operation is possible.

This object is achieved by the defining features of claim 1.

Regardless of whether the fluidized-bed chamber is in the form of an effervescent bed chamber (and therefore has the stated inclined surface), but very particularly in connection with this, it is advantageous if the features of claim 4 are realised. It is true that U.S. Pat. No. 3,360,867 has already proposed effecting transport by the pressure difference between individual chambers of a fluidized-bed, i.e. the product introduced was to be further conveyed by means of an energy difference between the individual chambers. However, the cost of achieving and maintaining a predetermined pressure difference is relatively high, since several chambers separated from one another have to be provided, it being necessary to assign special valves and control circuits to each of the said chambers. Moreover, the pressure does of course decrease, particularly in the first chamber, when material is to be fed in, so that operation cannot be carried out completely uniformly here but is merely "quasi-continuous".

To implement the principle of transport by pneumatic means on the basis of an energy difference in a simple manner, the features of claim 4 are expediently provided. In terms of production, it will be simplest if feature a) of claim 5 is realised. Feature b) of this claim also serves for simplifying production. It has been found that an embodiment according to feature c) of claim 5 is particularly advantageous, the distribution of the perforated areas from the feed apparatus to the outflow expediently having a cycloid character.

It is also known, for example, that amorphous polyester granules have to be dried to as uniform a depth and as carefully as possible before being melted in the extruder, in order to guarantee the stability and the desired properties of polyester filaments. Various processes and apparatus make it possible to carry out this drying. Batchwise processes using known tumble driers have the disadvantage that the drying times of between 10 and 50 hours are too long and the properties of the granules may change during temporary storage after drying.

Continuous processes, such as shaft driers of all types having a fixed bed, have the disadvantage that the apparatus cannot influence the temperature variation of the granules. DE-A-25 58 730 discloses a continuous process and an apparatus for crystallization and drying of polyethylene terephthalate in one stage. In the process, the granules are relatively at rest. Agglomeration is consciously accepted and the agglomerates have to be broken up again at a later stage. The apparatus consists of built-in mechanical parts which serve to break up agglomerates but which cause additional dust formation.

French Patent 2,355,863 relates to an apparatus for the continuous treatment of polyester granules, consisting of a crystallization zone, which is based on the fluidized-bed principle, and a drying zone, which contains a plurality of trays arranged one on top of the other. Each tray consists of rotating lamellae which are operated together. With this apparatus, however, the crystallization time is relatively long, the residence time spectra of the granules are broad, removal of dust from the polymer is unsatisfactory and, finally, the apparatus also contains mechanical parts, which results in a complicated and expensive arrangement.

Regardless of the treatment to be implemented, the stated disadvantages can be avoided by a treatment tower as outlined in claim 6.

Using such an apparatus, it is possible to implement a process which process permits repeatability of the drying procedure in an economical and reliable manner. The process according to the invention has proven particularly suitable for drying polyesters.

In the present description, polyesters are understood as being linear ester polycondensation products, prepared by reacting one or more diols of the series $HO(CH_2)_nOH$, where $1 < n < 10$, with a dicarboxylic acid, preferably terephthalic acid, or with a corresponding diester, such as dimethyl terephthalate. The polyester can also be modified with organic or inorganic additives.

It is surprising that the crystallization takes place in less than 3 minutes. Because of the short residence time, hydrolysis cannot occur. This means that the crystallization time is more than ten times faster compared with the prior art. Consequently, smaller apparatuses can be used for the same throughput of material, with the result that polyesters can be prepared in a more economical manner and with the use of less material.

It is also expedient to produce the effervescent bed with predried air or an inert gas. It is advantageous to pass hot gases flowing at high velocity via an annular disk and into the effervescence chamber, it being expedient to pass the hot gas via the heating mantle of the drier.

For crystallization in the effervescent bed, temperatures of 150° to 180° C. give the best results.

In the bed, drying is advantageously carried out under isothermal conditions at about 150° to 180° C. and constant humidity. The choice of the temperature depends on the type of granules to be dried, such as their shape and size, the throughput, the desired final moisture content, etc. Isothermal drying has the advantage that uniformly dried granules are provided for the subsequent melting procedure.

Regulation of the level of the granules in the drier part, for example by means of a probe, allows the residence time or drying time of the granules to be kept constant, by a suitable choice of the height of the bed of granules and depending on the throughput of granules. For this purpose, the rotary speed of the metering means is controlled via the level of the granules in such a way that the level of the granules remains constant.

The use of the treatment tower described above, results in freshly fed in product being picked up immediately and conveyed upward, thus preventing agglomerates. Particularly when a fluidized-bed chamber having the features a) of claim 5 is used, the heat supply, for example in the case of polyesters, is as large as possible on the feed side to prevent agglomeration at between 80° and 120° C. In the case of the treatment tower, it is expedient to choose an angle of inclination of 40 to 60 degrees for the outflow cone.

Further details of the invention are evident from the following description of embodiments schematically illustrated in the drawing.

Figure 1:
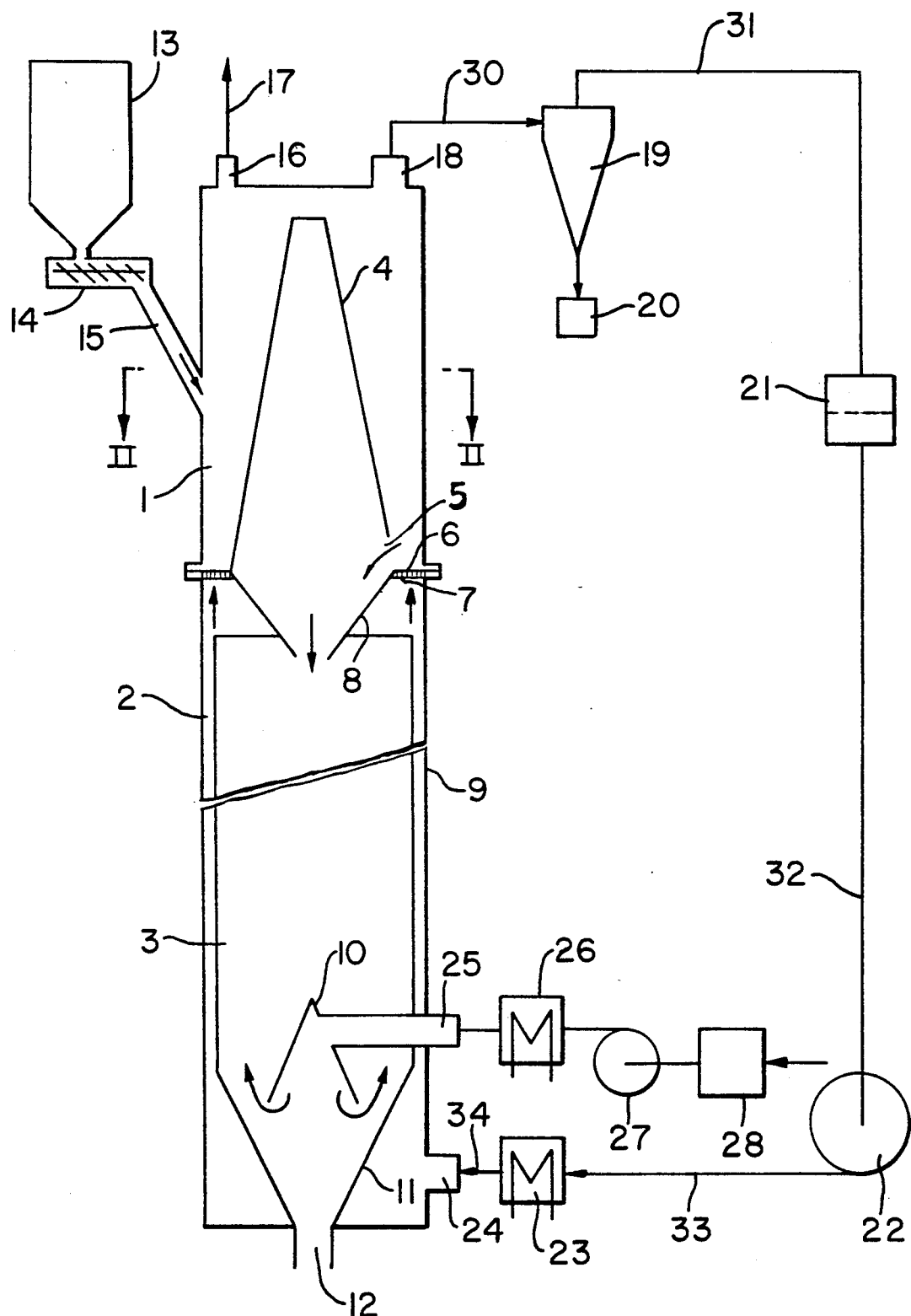
FIG. 1 shows a longitudinal section through a treatment tower according to the invention.

In FIG. 1, the apparatus according to the invention consists of an effervescent bed chamber 1 as a crystallizer part and an annular chamber 2 which, together with the chamber 3, forms the drier part. A displacement element 4 which has an outflow 5 in its base is provided in effervescent bed chamber 1. The displacement element 4 closes the inner diameter of an aeration surface 6. The aeration surface 6 has pneumatic means 7, which occur in different numbers in the individual segments but have the same diameter. An inlet hopper 8 is provided on the underneath of the aeration surface 6, the said hopper leading into the chamber 2, in the lower part of which a cone 11 having an outer orifice 12 for the dry product is provided.

The crystallizer part, which may also be referred to as a heating part, and the drier part are surrounded by a cylindrical jacket, which preferably consists of a tube. A cone 10 which is connected to an inlet nozzle 25 for fresh gas is provided in chamber 3, for distribution of the air. A storage bin 13 is connected via a metering apparatus 14 to an inlet nozzle 15, which enters the effervescent bed chamber 1. An outlet nozzle 16 and a waste air stack 17 are provided at the top of the crystallizer.

A further nozzle 18 leads via a pipe 30 to a cyclone 19 and a container 20. The cyclone 19 is connected by a pipe 31 to a filter 21, which is connected by a pipe 32 to a fan 22. From the fan 22, a pipe 33 leads to the gas heater 23, from which a pipe 34 leads to the nozzle 24. For feeding fresh gas via the nozzle 25, a heater 26, a fan 27 and a conditioning apparatus 28 are provided.

Figure 2:
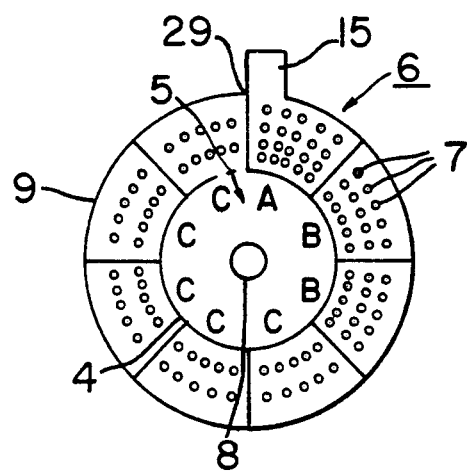
FIG. 2 shows a section along the line II—II in FIG. 1, which shows the perforated tray of the effervescent bed chamber in plan view.

FIG. 2 shows the arrangement and distribution of the holes 7 in the aeration surface 6.

A partition wall 29 which divides the effervescent bed chamber 1 into compartments is provided in the region of the inlet nozzle 15 and of the displacement nozzle 4. The number of holes decreases from the sector in the region of the inlet nozzle 15 to the outflow 5.

In principle, the size of the perforated surface could decrease more or less steadily from the feed nozzle 15 to the outflow 5; however, it is more advantageous for production if this occurs in steps, so that the perforated area is greatest (compared with the other sectors) in a sector A adjacent to the feed nozzle, is smaller in sectors B and is even smaller in sectors C. This produces a pattern which has almost cycloid characteristics, the product present in treatment chamber 1 receiving so much energy in sector A that its momentum continues beyond the second sector B; however, the material receives further momentum in the region of the transition from the second sector B to the first sector C through the energy gradient thus created, this further momentum ensuring uniform advance to the outflow 5. This makes production particularly simple and enables it to be carried out with a single type of punch tool if the holes of the pneumatic means 7 are all of the same size.

Figure 3:
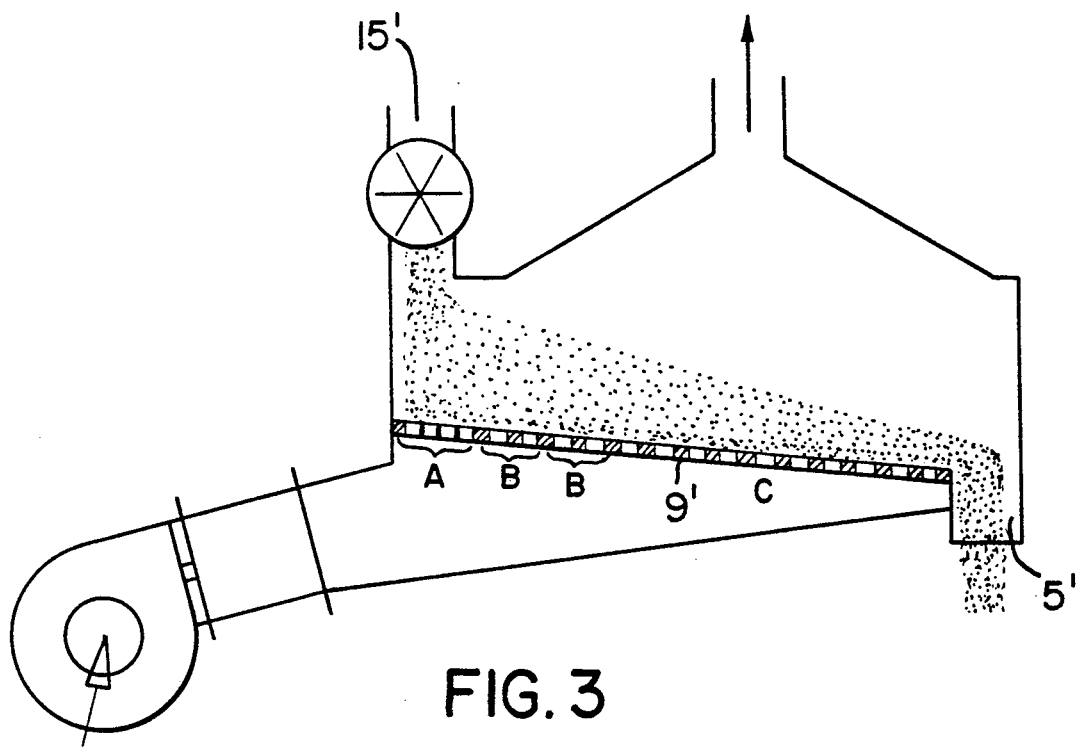
FIG. 3 shows a further embodiment having a hole distribution analogous to FIG. 2, but in a fluidized-bed chamber without an effervescent effect.

As shown in FIG. 3, this principle of material transport can also be realized in conventional fluidized-bed chambers, a relatively great bed height, which decreases toward sectors B, resulting in the region of sector A, whereupon the bed height decreases up to outflow 5', so that in general a gradient occurs from feed nozzle 15' to outflow 5'. This gradient can be further supported in a conventional manner if perforated tray 9' itself also slopes downward.

Instead of the decreasing number of orifices of equal diameter, it is also possible for the diameters of the orifices to decrease in a direction from the nozzle 15 to the outflow 5, the number of holes remaining the same. What is important is that the entering granules are met by as large an amount of hot air as possible at the beginning.

During operation of the apparatus, for example, moist amorphous polyester granules consisting of polyethylene terephthalate from the bin 13 are metered continuously by the metering apparatus 14 via the inlet nozzle 15 into the effervescent bed chamber 1. A gas stream consisting of conditioned air or circulated air flows, in an amount of 5 to 50 kg/hour of air per kg of granules throughput per hour, under the same pressure, at a temperature of 150°–180° C., preferably at 170° C., through the pneumatic means 7 of the aeration surface 6 into the effervescent bed chamber 1 and picks up the granules entering. Since the amount of gas effects fluidization of the granules and fresh granules are constantly introduced, the granules are caused to flow toward the outlet. However, the specifically larger amount of air in the first sector also effects intensive dedusting of the granules and heats them to the predetermined drier temperature before they emerge from the effervescent bed chamber 1. The mean residence time in the crystallizer is not more than 3 minutes, preferably 1–3 minutes. The crystallized granules flow continuously through the orifice of the outflow 5 in displacement element 4, through the inlet hopper 8 and into chamber 3. In chamber 3, the bed of granules moves under isothermal conditions and, possibly under a slight vacuum, by means of their own weight, via the cone 11 and through the outlet nozzle 12 for further processing, for example for melting in an extruder. The inclination of the displacement element is adapted to a certain product and should be 50 to 85 degrees for polyesters.

The granules are crystallized in the crystallizer or in the heating part by means of an air stream which has a high velocity and as a rule consists of circulated air from which dust has been removed and which passes via filter 21 and fan 22 and is heated to 150°–180° C., preferably 170° C., in a heater. The air stream or an inert gas flows through the annular chamber 2, which simultaneously serves as a jacket for the drier and thus guarantees the isothermal conditions inside. The velocity of the gas is chosen so that the height of the effervescent bed corresponds approximately to the middle level of the displacement element 4. This ensures that, on the one hand, no granules enter the outlet nozzle 18 for the circulated air, and, on the other hand, effective dust removal is achieved. The excess air is removed via nozzle 16 and waste air stack 17.

The major part of the hot waste air is fed via pipe 30 to a cyclone separator 19 and freed from dust and abraded material. The dust is collected in container 20 and is discarded. A fine filter 21 is located downstream of the cyclone 19 for safety.

For drying with air, the latter is passed via a commercial dehumidification and conditioning system 28 for fresh air, compressed via fan 27, brought to the drying temperature, which is likewise 150°–180° C., preferably 170° C., in heater 26 and distributed in the material being dried, via inlet nozzle 25 and cone 10. The amount of gas is 0.5 to 2 kg of air/hour per kg of granules per throughput per hour. After absorption of moisture, the waste air meets the crystallized granules at a low flow velocity through outflow 5, flows through the effervescent bed and leaves the crystallizer, together with the air for effervescence, via nozzle 18.

An important advantage of the invention is its simple, economical procedure for achieving uniform quality. Complete removal of dust from the granules occurs. In the downstream bed of the drier, no further abrasion occurs. Without mechanically moving means, the apparatus is preferably used for the continuous drying of polyester granules and, because of its simplicity, is economical to produce.

However, the apparatus is also suitable for drying plastics granules without prior crystallization. In this case, the part designated as the crystallizer serves merely for heating the granules. If any plastics granules are to be dried to a prescribed final moisture content, the drying gas must be adjusted to a corresponding equilibrium moisture content.

The residence of the granules in the effervescent bed chamber, which lasts for only a few minutes, prevents damage by hydrolysis. The intensive heating up of the granules through transverse flow until immersion from the effervescent bed chamber enables the granules to enter the inlet hopper at the drier temperature, thus ensuring that, as a result of the isothermal final drying, fluctuations in the final moisture content due to an uncertain temperature variation are avoided.

The treatment tower according to the invention and the process according to the invention are particularly suitable for drying plastics granules of all types, but in particular for polyester granules. Further applications are, in particular, in the food sector.

I claim:

1. In an apparatus for fluidizing particulate material over a predetermined operation height within a gas stream,
    wall means forming a fluidizing chamber, said wall means including an annular gas permeable bottom wall having an outer circumference and an inner circumference;
    inlet means within said wall means for introducing said particulate material into said chamber;
    outlet means for discharging said material from said chamber;
    a hat-shaped superseding body connected to said inner circumference and rising above said bottom wall in the middle of said chamber concentrically to it, said body extending substantially in total over said operation height and having a cross-section which diminishes from below to above at least in a lower portion of its height;
    partition means extending between said wall means and said superseding body, said inlet means being located on one side of said partition means, while said outlet means are situated on the other side of said partition means;
    pneumatic conveying means on said bottom wall for assisting in movement of said particulate material from said inlet means toward said outlet means.

2. Apparatus as claimed in claim 1, wherein said superseding body is conical from the bottom up to the top.

3. Apparatus as claimed in claim 1, wherein
    said chamber is annular, extending around said superseding body, and
    said outlet means are located radially inwardly of said annular chamber.

4. Apparatus as claimed in claim 3, wherein said superseding body comprises an opening in vicinity of said annular bottom wall, said opening forming said outlet means at least in part.

5. Apparatus as claimed in claim 4, wherein said opening is located at the connection of said superseding body with said bottom wall.

6. In an apparatus for fluidizing particulate material over a predetermined operation height within a gas stream,
    wall means forming a fluidizing chamber, said wall means including a bottom wall having an arrangement of holes, said holes covering a certain total hole area;
    inlet means within said wall means for introducing said particulate material into said chamber;
    outlet means for discharging said material from said chamber;
    pneumatic conveying means on said bottom wall for assisting in movement of said particulate material from said inlet means toward said outlet means, said pneumatic conveying means comprising said arrangement of holes having an overall hole area which diminishes from said inlet means toward said outlet means.

7. Apparatus as claimed in claim 6, wherein said arrangement of holes comprises a number of holes which is diminishing from said inlet means toward said outlet means.

8. Apparatus as claimed in claim 7, wherein said holes are each of the same size.

9. Apparatus as claimed in claim 6, wherein said overall hole area diminishes in steps, wherein the size of the holes is equal in each of said steps.

10. Apparatus as claimed in claim 6, wherein said overall hole area diminishes unevenly from said inlet toward said outlet, wherein the hole area diminishes more in vicinity of said inlet means than in the vicinity of said outlet means.

11. A tower-shaped apparatus for treating particulate material by fluidizing it in a gas stream, the apparatus comprising wall means forming an upper fluidizing chamber and a lower fluidizing chamber;

inlet means within said wall means for introducing said particulate material into said upper fluidizing chamber;

lower outlet means for discharging said material from said lower fluidizing chamber;

annular perforated deck means between said upper and lower fluidizing chambers, said annular deck means having an outer circumference and an inner circumference;

a hat-shaped superseding body connected to said inner circumference and rising above said bottom wall in the middle of said upper fluidizing chamber concentrically to it, said body having a cross-section which diminishes from below to above at least in a lower portion of its height;

upper outlet means within the region of the connection of said deck means and said body for discharging said particulate material from said upper fluidizing chamber into said lower fluidizing chamber.

12. Apparatus as claimed in claim 11, further comprising partition means extending between said wall means and said superseding body, said inlet means being located on one side of said partition means, while said upper outlet means are situated on the other side of said partition means.

13. Apparatus as claimed in claim 11, wherein said outlet means are located radially inwardly of said annular upper fluidizing chamber.

14. A method for crystallizing a particulate polymer material by treating it within a fluidizing bed, the method comprising the steps of crystallizing said polymer material by fluidizing it within a whirling bed, where gas is blown through with a velocity sufficient to whirl the particles up, while falling down above a low energy area of the gas;

employing an oblique surface inclined relative to a central axis of the fluidized bed to prevent the gas from streaming freely upwardly; and then drying said particulate polymer material in said bed by blowing gas through a bulk of it.

15. Method as claimed in claim 14, wherein said crystallizing step is effected within a period of less than 3 minutes.

16. Method as claimed in claim 14, wherein the gas used within said crystallizing step has a temperature of 150° to 180° C. when entering.

17. Method as claimed in claim 14, wherein the gas used within said crystallizing step is selected from the group comprising an inert gas and predried air.

18. Method as claimed in claim 17, wherein said gas is introduced into a whirling chamber through an annular perforated deck.

19. Method as claimed in claim 14, wherein the gas used within said crystallizing step streams isothermally through said whirling particulate material.

20. Method as claimed in claim 14, wherein said steps of crystallizing and drying are continuously effected in two adjacent zones, the material flowing from a crystallizing zone over a transition zone into a drying zone.

21. Method as claimed in claim 20, wherein the gas used within said crystallizing step has at least approximately the same temperature at the transition zone, as in the crystallizing zone.

22. Method as claimed in claim 14, wherein said polymer material is a polyester.

23. Method as claimed in claim 14, wherein said particulate material is in the form of granules.

* * * * *